(12) United States Patent
Schneider et al.

(10) Patent No.: US 8,444,526 B1
(45) Date of Patent: May 21, 2013

(54) MULTI-RATIO PLANETARY GEAR TRANSMISSION

(75) Inventors: Dean Schneider, Washington, MI (US);
Alexander Serkh, Troy, MI (US);
Imtiaz Ali, Lathrup Village, MI (US);
Peter Ward, Farmington Hills, MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 13/440,474

(22) Filed: Apr. 5, 2012

(51) Int. Cl.
*F16H 3/44* (2006.01)

(52) U.S. Cl.
USPC .......................... 475/299; 475/271; 475/282

(58) Field of Classification Search
USPC ................... 475/27, 282, 296, 298, 299, 303, 475/311, 317, 330
See application file for complete search history.

(56) References Cited

U.S. PATENT DOCUMENTS

| | | | | |
|---|---|---|---|---|
| 594,195 A * | 11/1897 | Cooke | ........................... | 475/286 |
| 2,069,408 A * | 2/1937 | Forichon | ....................... | 475/285 |
| 2,101,233 A * | 12/1937 | Bancroft | ........................ | 475/259 |
| 2,827,805 A * | 3/1958 | Miller | ............................ | 475/282 |
| 3,263,663 A * | 8/1966 | Connell | ..................... | 123/195 R |
| 4,393,964 A * | 7/1983 | Kemper | ............................ | 477/6 |
| 4,721,083 A * | 1/1988 | Hosaka | .......................... | 477/111 |
| 6,786,845 B1 * | 9/2004 | Haka | .............................. | 475/275 |
| 7,582,040 B2 | 9/2009 | Kamm et al. | | |
| 7,591,752 B2 | 9/2009 | Gumpoltsberger | | |
| 2010/0280712 A1 * | 11/2010 | Bowman | .......................... | 701/36 |
| 2011/0106359 A1 * | 5/2011 | Tanaka et al. | ................... | 701/22 |

FOREIGN PATENT DOCUMENTS

| EP | 1736687 B1 | 1/2011 |
|---|---|---|
| JP | 2010-185505 | 8/2010 |

* cited by examiner

*Primary Examiner* — Justin Holmes
(74) *Attorney, Agent, or Firm* — J. A. Thurnau, Esq.; P. N. Dunlap, Esq.

(57) ABSTRACT

A transmission comprising a first compound planetary gear set having a first brake engaged with a sun gear, a second compound planetary gear set having a second brake engaged with a ring gear, the first compound planetary gear set and the second planetary gear set axially engagable through a first clutch and a second clutch, and the transmission input and transmission output disposed coaxially and configured to input and output torque from the same side of the transmission.

6 Claims, 9 Drawing Sheets

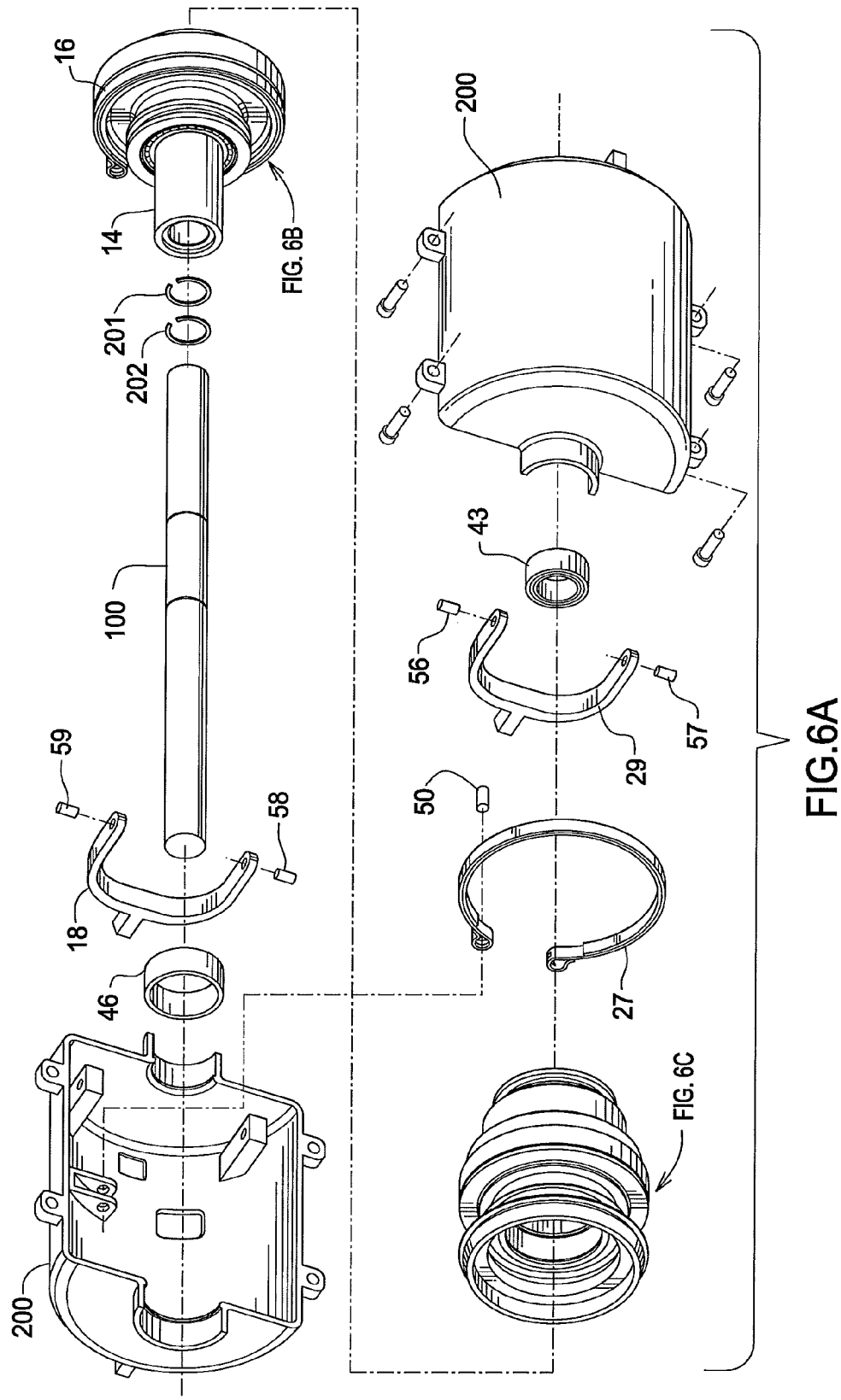

United States Patent US 8,444,526 B1

MULTI-RATIO PLANETARY GEAR TRANSMISSION

FIELD OF THE INVENTION

The invention relates to a multi-ratio planetary gear transmission, and in particular, to a planetary gear transmission comprising a first compound planetary gear set having a brake engaged with a sun gear, a second compound planetary gear set having a brake engaged with a ring gear, the first compound planetary gear set and the second planetary gear set axially engagable through a first clutch and a second clutch.

BACKGROUND OF THE INVENTION

Representative of the art is U.S. Pat. No. 7,582,040 which discloses an eight-gear gearbox comprising an input shaft, an output shaft, four planetary gear sets, eight rotatable shafts and five shifting elements.

What is needed is a transmission comprising a first compound planetary gear set having a brake engaged with a sun gear, a second compound planetary gear set having a brake engaged with a ring gear, the first compound planetary gear set and the second planetary gear set axially engagable through a first clutch and a second clutch. The present invention meets this need.

SUMMARY OF THE INVENTION

The primary aspect of the invention is to provide a transmission comprising a first compound planetary gear set having a brake engaged with a sun gear, a second compound planetary gear set having a brake engaged with a ring gear, the first compound planetary gear set and the second planetary gear set axially engagable through a first clutch and a second clutch.

Other aspects of the invention will be pointed out or made obvious by the following description of the invention and the accompanying drawings.

The invention comprises a transmission comprising a first compound planetary gear set having a first brake engaged with a sun gear, a second compound planetary gear set having a second brake engaged with a ring gear, the first compound planetary gear set and the second planetary gear set axially engagable through a first clutch and a second clutch, and the transmission input and transmission output disposed coaxially and configured to input and output torque from the same side of the transmission.

BRIEF DESCRIPTION OF THE DRAWINGS

The accompanying drawings, which are incorporated in and form a part of the specification, illustrate preferred embodiments of the present invention, and together with description, serve to explain the principles of the invention.

FIGS. 6a, 6b and 6c are exploded views of the transmission.

DETAILED DESCRIPTION OF THE PREFERRED EMBODIMENT

The inventive device is a planetary drive arrangement with four speeds output to a slip clutch. An open 1:1 gear ratio, a 0.772 gear ratio (1.295:1 speed ratio) planetary set, and a 0.478 gear ratio (2.09:1 speed ratio) planetary set are combined to provide three speeds. The device also enables a $4^{th}$ drive ratio that combines the 0.772 (1.295) and 0.478 (2.09) ratios in series and yields a 0.369 (2.70) ratio should that be deemed necessary. The ratios are summarized in Table 1.

The inventive device is arranged such that the output shaft is coaxial with the input shaft. This inventive arrangement allows the transmission output to be taken off either end of the transmission. The configuration is such that power flows into the transmission, through the transmission gearing, into the slip clutch and is then output to the driven, for example a flywheel.

Figure 1:
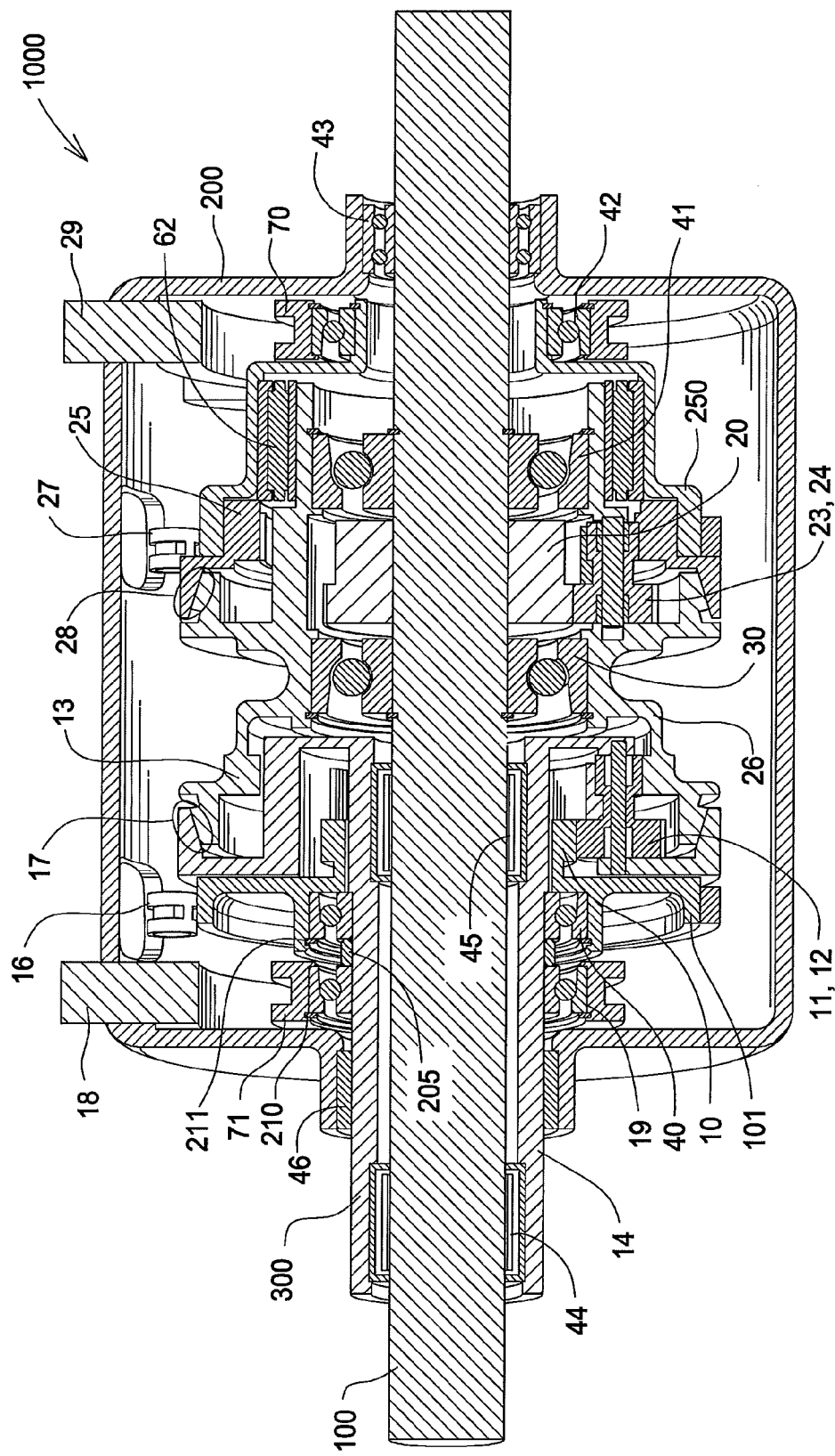
FIG. 1 is a cross sectional view of the transmission.

FIG. 1 is a cross sectional view of the transmission. The transmission consists of a first compound planetary gear set, a second compound planetary gear set, a first clutch, a second clutch, a first brake, a second brake, an output shaft, an input shaft, and a housing.

The first compound planetary gear set comprises sun gear 10 having 81 teeth. The first compound planetary gear set further comprises pinion 11 having 29 teeth and pinion having 13 teeth. Pinion 11 is engaged with sun 10. Pinion 12 is engaged with ring 13 having 123 teeth.

The second compound planetary gear set comprises sun 20 having 81 teeth. The second compound planetary gear set further comprises pinion 23 having 25 teeth and pinion 24 having 15 teeth. Pinion 23 is engaged with sun 20. Pinion 24 is engaged with ring 25 having 121 teeth.

The output of the first planetary gear set is ring 13 which is fixedly attached to planet carrier 26 which his part of the second compound planetary gear set. The input for the first compound planetary gear set is carrier 14. The input for the second compound planetary gear set is carrier 26. The output for the second compound planetary gear set is sun 20. Sun 20 is fixedly attached to the transmission output shaft 100.

Brake 16 is operationally positioned between sun 10 and the housing 200. Brake 27 is operationally positioned between ring 25 and the housing 200. Clutch 17 is operationally between carrier 14 and ring 13. Clutch 28 is operationally between carrier 26 and ring 25. Bearing 19 is disposed between shift fork 18 and carrier 14 (input shaft). Bearing 40 is disposed between sun 10 and carrier 14. Bearing 30 is disposed between carrier 26 and output shaft 100. Bearing 41 is disposed between carrier 26 and output shaft 100. Bearing 42 is disposed between ring 25 and shift fork 29. Bearing 43 is disposed between housing 200 and output shaft 100. Needle bearings 44, 45 are disposed between carrier 14 and output shaft 100. Bearing 46 is disposed between housing 200 and carrier 14. Bearing 62 is disposed between ring 25 and carrier 26. Spacer 205 is disposed between bearings 19 and 40.

Clutch 17 is operationally disposed to engage and disengage between carrier 14 and carrier 26. To engage clutch 17, an actuator (not shown) moves shift fork 18 thereby moving bearing carrier 71 which in turn forces carrier 14 to move axially thereby engaging clutch 17 with carrier 26. This effectively locks the first compound planetary gear set forcing the transmission ratio to 1:1.

To engage clutch 28, an actuator (not shown) moves shift fork 29 thereby moving bearing carrier 70 which in turn forces carrier 250 to move axially which forces clutch 28 to engage carrier 26. Bearings 30 and 41 are keyed to shaft 100, thereby locating carrier 26 to prevent axial movement by carrier 26. Band brake 16 engages a brake portion 101 of sun 10. Band brake 27 engages a brake portion 251 of carrier 250.

To engage brake 16, an actuator (not shown) moves one end of band brake 16 thereby engaging the brake with portion 101 to stop sun 10. To engage brake 27, an actuator (not shown) moves one end of band brake 27 thereby engaging the brake with portion 251 and stopping carrier 250. The band brakes 16, 27 are arranged such that the band winds tighter as the engaged components rotate. This arrangement requires very small forces to actuate the brake. The actuator simply pushes the end of each band against the rotating component at which time the band grabs and winds tight, stopping the rotating component.

The gear selection is summarized in Table 1.

TABLE 1

Transmission Operation

| Gear Operation | | | | | |
|---|---|---|---|---|---|
| Gear | 17 Clutch 1 condition | 28 Clutch 2 Condition | 16 Brake 1 Condition | 27 Brake 2 Condition | Final Gear Ratio |
| First | Engaged | Engaged | Disengaged | Disengaged | 1:01 |
| Second | Disengaged | Engaged | Engaged | Disengaged | 0.772 |
| Third | Engaged | Disengaged | Disengaged | Engaged | 0.478 |
| Fourth | Disengaged | Engaged | Disengaged | Engaged | 0.369 |

The use of compound planets (11,12) and planets (23,24) enables an overall reduction in the size of the two compound planetary gear sets. For example, in order to obtain the same ratio of the first gear set while maintaining a sun having 81 teeth, the planet and ring would require gears of 97 teeth and 275 teeth respectively. The compound arrangement also enables a level of freedom in arrangement. For example, the compound planet may be reversed axially allowing an alternate placement of the ring gear. Such a change may enable a better assembly process.

Figure 2:
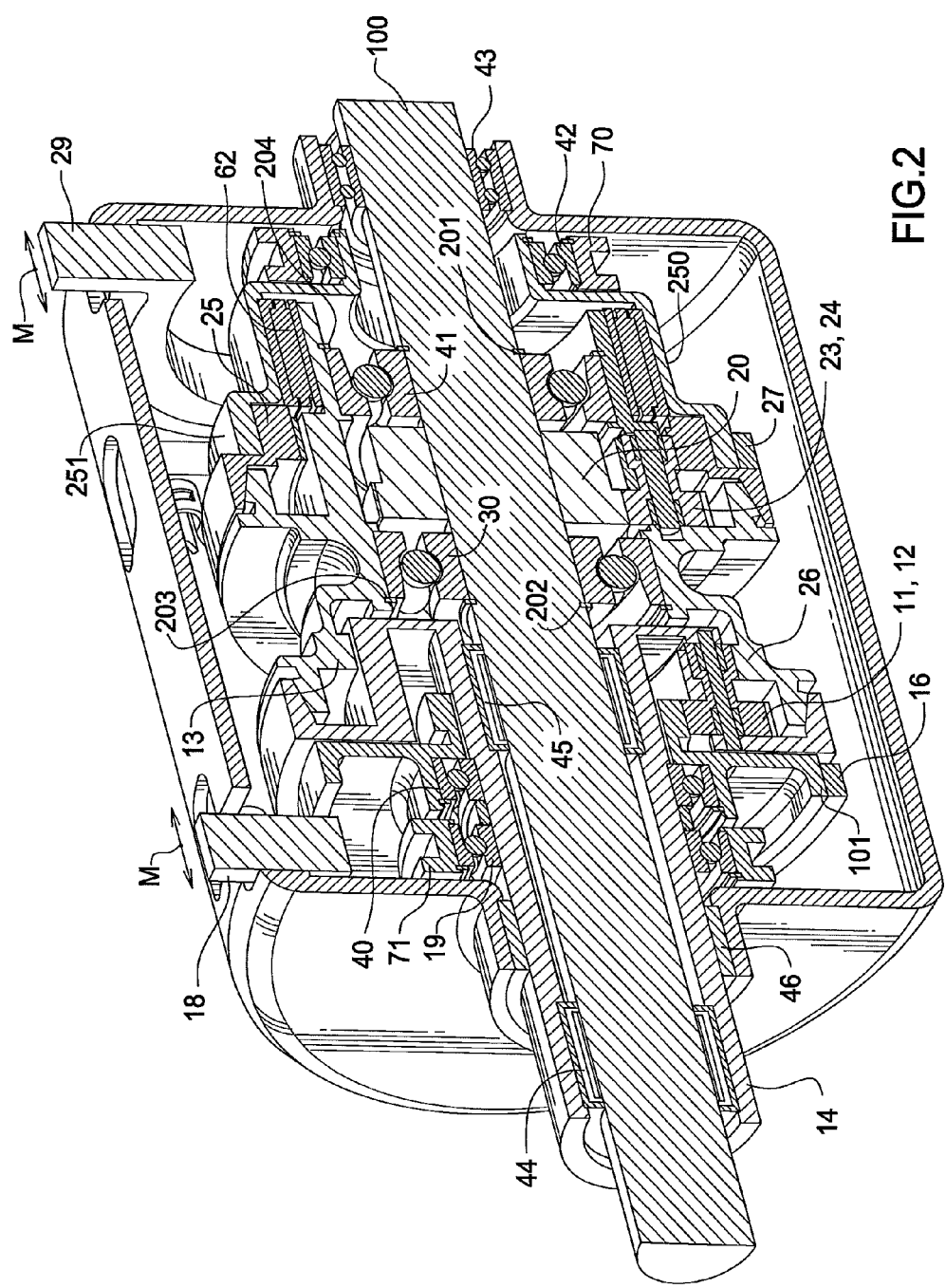
FIG. 2 is a perspective cross section view of FIG. 1.

FIG. 2 is a perspective cross section view of FIG. 1. Snap rings 201, 202 engage shaft 100. Snap rings 203, 204 engage carrier 26. Bearings 30 and 41 are retained between snap rings 201, 202, 203, 204. Sun gear 20 is retained between bearings 30, 41. This arrangement retains carrier 26 in a fixed axial position with respect to shaft 100.

Figure 3:
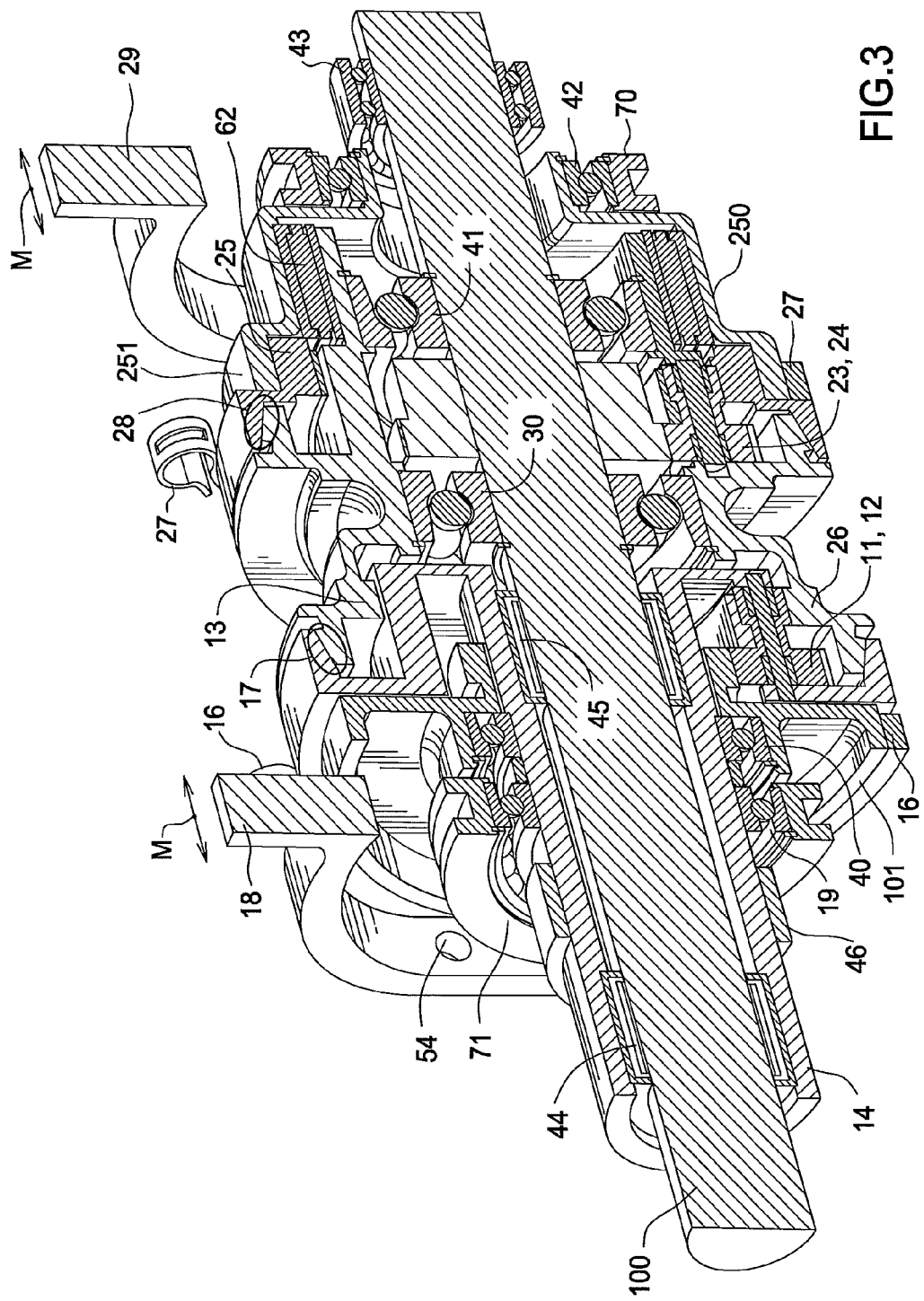
FIG. 3 is a perspective cross section view of the compound planetary gear sets.

FIG. 3 is a perspective cross section view of the compound planetary gear sets. Carrier 250 comprises ring 25 and portion 251 for engaging brake 27. Shift fork 18 and shift fork 29 each move pivotally in an axial direction (M), thereby engaging and disengaging clutch 17 and clutch 28 respectively.

Figure 4:
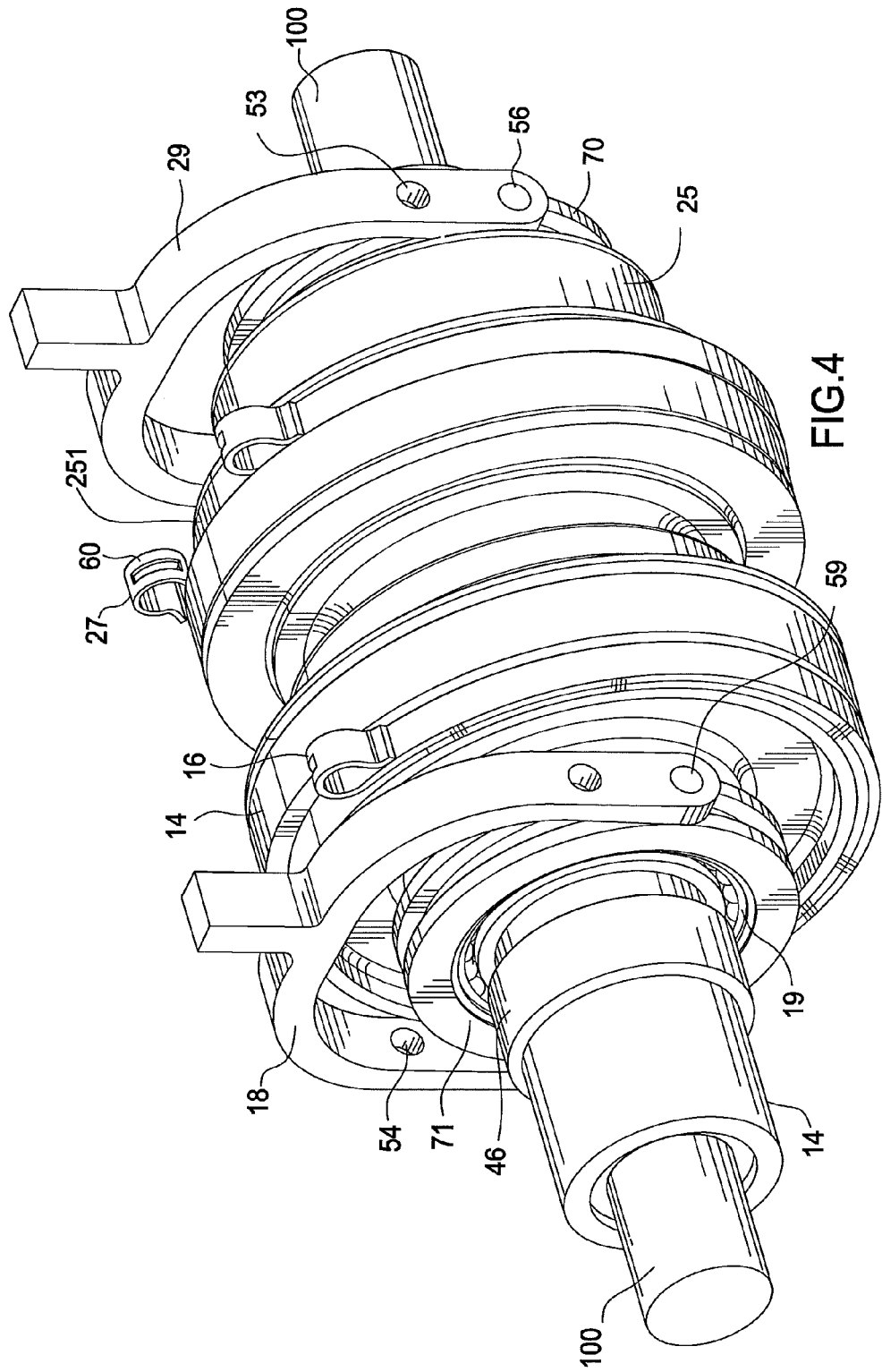
FIG. 4 is a perspective view of the compound planetary gear sets.

FIG. 4 is a perspective view of the compound planetary gear sets.

Figure 5:
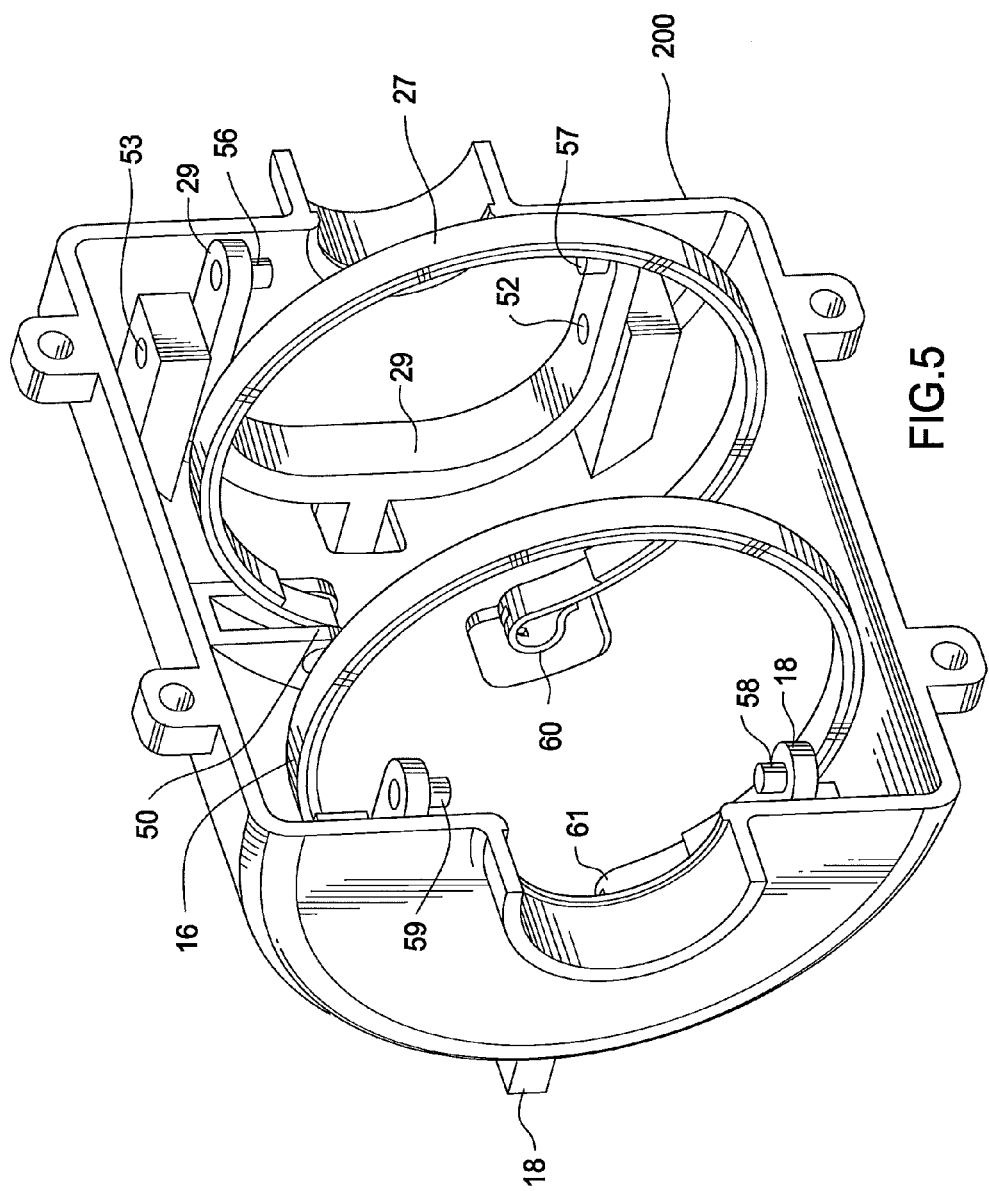
FIG. 5 is a perspective view of the brakes.

FIG. 5 is a perspective view of the brakes. Brake is attached to the housing 200 at a fixed point 50. Brake 16 is attached to the housing 200 at a fixed point 51. Shift fork 29 pivots about a pivot 52 and pivot 53. Shift fork 18 pivots about a pivot 54 and pivot 55.

Pins 56 and 57 on shift fork 29 engage a bearing carrier 70. Pins 58 and 59 on shift fork 18 engage a bearing carrier 71.

Bearing carrier 70 has a "U" shaped profile to accommodate pins 56, 57. Bearing carrier 71 has a "U" shaped profile to accommodate pins 58, 59.

An actuator (not shown) connects to an end 60 of brake 27. An actuator (not shown) connects to an end 61 of brake 16.

Figure 6B:
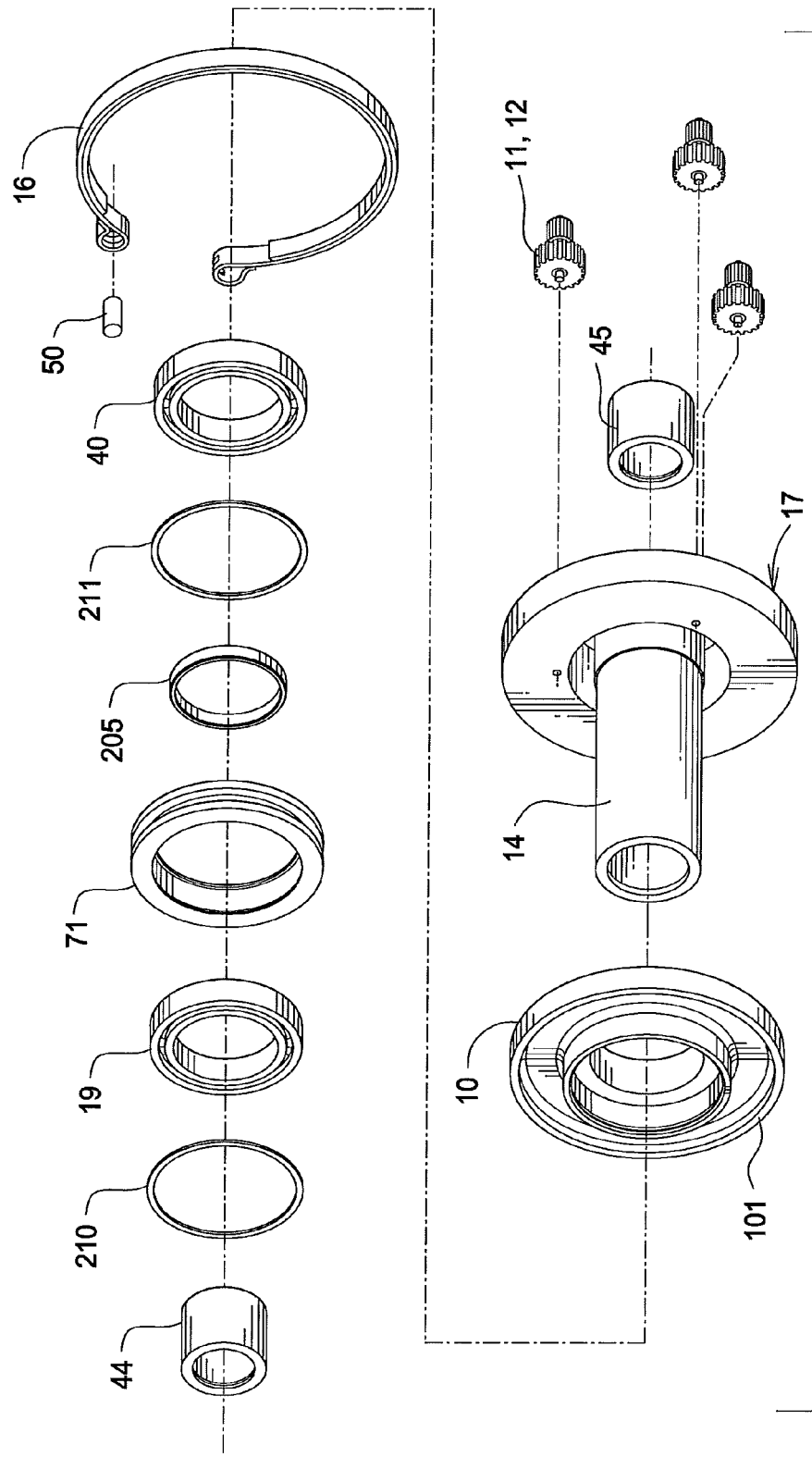
Figure 6C:
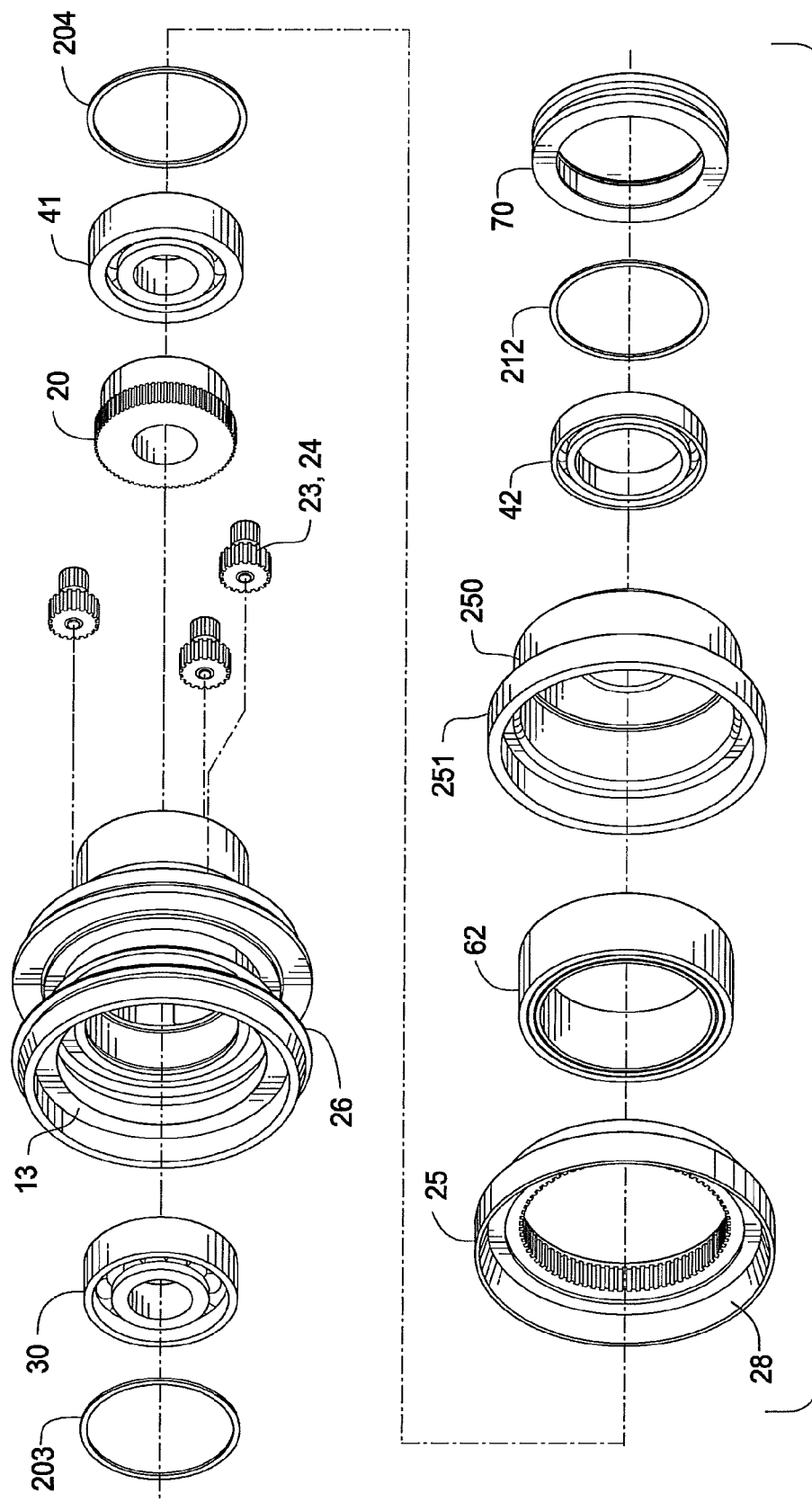

FIGS. 6a, 6b and 6c are exploded views of the transmission. FIG. 6b is a view of the first compound planetary gear set. FIG. 6c is a view of the second compound planetary gear set.

In FIG. 6b, snap ring 210 retains bearing 19 in bearing carrier 71. Snap ring 211 retains bearing 40 in sun 10.

In FIG. 6c, snap ring 203 retains bearing 30 in carrier 26. Snap ring 204 retains bearing 41 in carrier 26. Snap ring 212 retains bearing 42 in bearing carrier 70.

In operation, in order to engage clutch 17, an actuator moves shift fork 18 which in turn forces carrier 14 to move axially, thereby engaging carrier 14 with clutch 17. This effectively locks the planetary assembly attached to carrier 14 forcing the first planetary gear ratio to 1:1. To engage clutch 28, an actuator moves shift fork 29 which in turn forces ring 25 to move axially which causes clutch 28 to be engaged.

To engage either brake 16 or 27, an actuator moves one end of the band brake, thereby engaging the brake and stopping the respective carrier engaging the respective planetary set. Each brake is configured such that the band winds tighter as the carrier rotates. This arrangement requires very small forces to actuate the brake since the frictional force is a natural log e function, namely, $(T1/T2) = e^{\lambda \cdot \beta}$, where T1 and T2 represent a band tension, $\lambda$ is a coefficient of friction and $\beta$ is a wrap angle. Hence, one can simply push the end against the rotating carrier and the band will grab and wind tight stopping the carrier.

When clutch 17 and clutch 82 are both engaged, and brake 16 and brake 27 are disengaged, the transmission has a 1:1 ratio. When clutch 17 is disengaged and brake 16 is locked with clutch 28 engaged and brake 27 disengaged, the transmission has the gear ratio 0.772 (1.295:1 speed ratio). When clutch 17 is engaged and brake 16 is disengaged with clutch 28 disengaged with brake 27 engaged, the transmission has the gear ratio 0.478 (2.09:1 speed ratio). When both clutches are disengaged and both brakes are engaged, the transmission has the gear ratio 0.369 (2.70 speed ratio).

Figure 7:
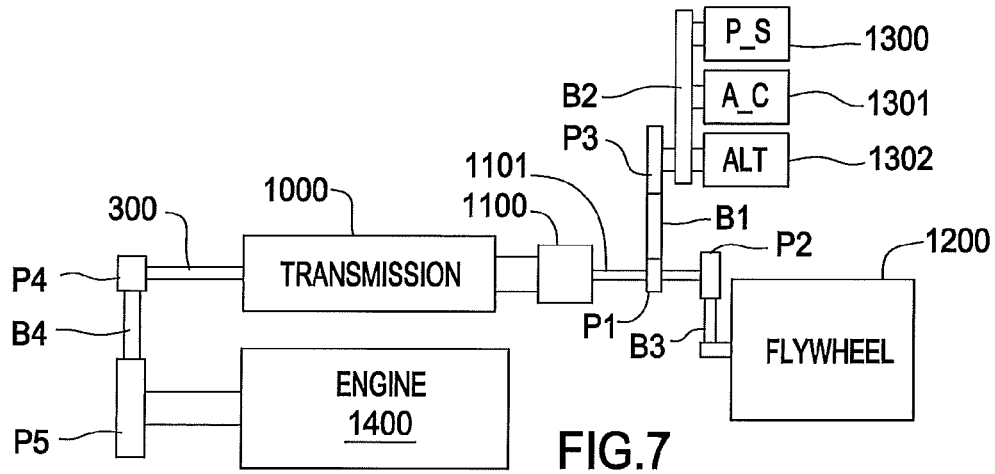
FIG. 7 is a schematic system using the inventive transmission.

FIG. 7 is a schematic system using the inventive transmission. In this embodiment, a slip clutch 1100 is connected to the output shaft 100 of the transmission.

In a first operating mode, engine 1400 drives input shaft 300 through a pulley P5, a belt B4 and a pulley P4. The diameter of each pulley P5 and P4 can be varied to provide a desired ratio.

A slip clutch output shaft 1101 engages a pulley P1 and P2. A belt B1 is trained between P1 and pulley P3. A belt B3 is trained between pulley P2 and a flywheel 1200 input. Pulley P3 is connected to an alternator input shaft 1302. A belt B2 is trained between each accessory, namely, a power steering pump (P_S) 1300, an air conditioning pump (A_C) 1301, and an alternator (Alt) 1302.

When engine 1400 is driving the system, transmission 1000 can be used to select a desired gear ratio to optimize operation of the accessories. The accessories are driven through belts B1 and B2. Slip clutch 1100 provides a soft coupling between the engine and the accessories for start ups.

In a second operating mode the flywheel is used to drive the accessories. In this mode the slip clutch is disengaged and the accessories are driven through belts B3, B2 and B1. Engine 1400 may operate at idle or be shut down.

Figure 8:
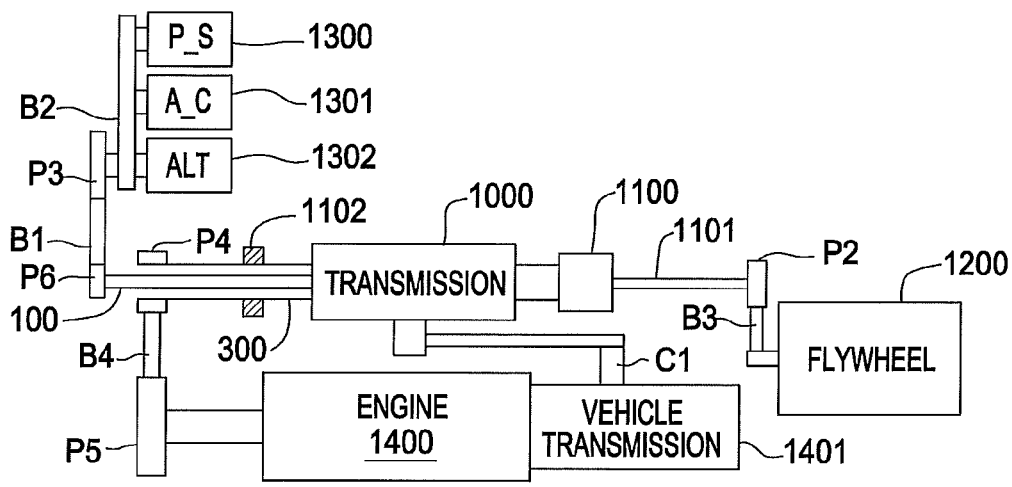
FIG. 8 is a schematic system using the inventive transmission.

FIG. 8 is a schematic system using the inventive transmission. Unlike the embodiment in FIG. 7, the accessories in this embodiment are driven from the opposite side of the transmission 1000. The shafts 100 and 300 are coaxial.

Pulley P6 is connected to shaft 100. Pulley P4 is connected to input shaft 300 which is carrier 14. Belt B1 is trained between pulley P6 and pulley P3. Belt B4 is trained between pulley P5 and P4.

A vehicle transmission 1401 is connected to the engine 1400, typically to an engine crankshaft. The vehicle transmission 1401 is used to drive transmission 1000. For example, this can be accomplished with a chain C1 engaged with the transmission torque converter. C1 is mechanically connected to the input shaft 300. Clutch 1100 is connected to shaft 100. Clutch 1100 is used to engage and disengage the flywheel from the transmission, and thereby from the accessories and engine.

The advantage of taking the power off the transmission torque converter is that it allows the engine 1400 to stop while still maintaining the ability to recover regenerative braking power. This configuration also enables the engine to be started with the flywheel 1200 while taking power off the transmission 1401. Clutch 1102 allows disconnection of the engine when the engine is shut off for configurations drawing power off the vehicle transmission 1401, for example during a braking event. Clutch 1102 is used to engage or disengage engine 1400 from transmission 1000.

Figure 9:
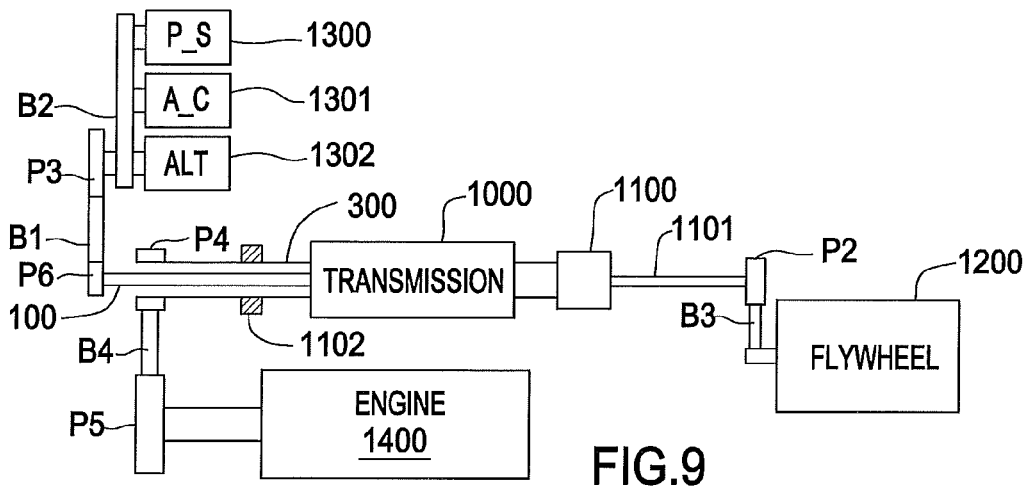
FIG. 9 is a schematic system using the inventive transmission.

FIG. 9 is a schematic system using the inventive transmission. The configuration in FIG. 9 is the same as described in FIG. 8, with the exception the vehicle transmission 1401 is absent.

All the configurations described herein enable starting of the engine 1400 with the flywheel 1200.

The novel features of this device and the described configurations include but are not limited to 1) the overall final drive ratio of the accessory drive is selected so the final speeds of the accessory drive can be either faster or slower than engine speed, as opposed to when the accessories are driven directly from the engine crankshaft output pulley, 2) the power taken from the vehicle can be taken from the engine or from the vehicle transmission, 3) the inventive device allows the power output to be in the front, rear, or next to the engine, 4) the input and output shafts are coaxial allowing power to be output from either end of the device, 5) the inventive device allows the engine to be shut off during braking events, 6) the inventive device allows the engine to be started with power stored in the flywheel, and 7) the inventive device allows the engine to be shut off while continuously maintaining power supply or other vehicle functions including the accessory drive.

Although forms of the invention have been described herein, it will be obvious to those skilled in the art that variations may be made in the construction and relation of parts without departing from the spirit and scope of the invention described herein.

We claim:

1. A transmission comprising:
a first compound planetary gear set having a first brake engaged with a sun gear;
a second compound planetary gear set having a second brake engaged with a ring gear;
the first compound planetary gear set and the second planetary gear set axially engagable through a first clutch and a second clutch; and
the transmission input and transmission output disposed coaxially and configured to input and output torque from the same side of the transmission.

2. The transmission as in claim 1 further comprising:
a mechanism for engaging and disengaging the first clutch by an axial movement of the first compound planetary gear set; and
a mechanism for engaging and disengaging the second clutch by an axial movement of the second compound planetary gear set.

3. The transmission as in claim 2, wherein:
the first brake comprises a band brake; and
the second brake comprises a band brake.

4. An accessory drive system comprising:
a vehicle engine;
the vehicle engine coupled to a transmission;
the transmission coupled to an accessory drive, the accessory drive comprising an alternator;
the transmission comprising;
a first compound planetary gear set having a first brake engaged with a sun gear;
a second compound planetary gear set having a second brake engaged with a ring gear;
the first compound planetary gear set and the second planetary gear set axially engagable through a first clutch and a second clutch;
the transmission input and transmission output disposed coaxially and configured to input and output torque from the same side of the transmission; and
a flywheel directly coupled to the transmission and further directly coupled to the accessory drive, the accessory drive being selectively drivable by the flywheel or the vehicle engine.

5. The accessory drive as in claim 4, wherein:
a mechanism for engaging and disengaging the first clutch by an axial movement of the first compound planetary gear set; and
a mechanism for engaging and disengaging the second clutch by an axial movement of the second compound planetary gear set.

6. The transmission as in claim 5, wherein:
the first brake comprises a band brake; and
the second brake comprises a band brake.

* * * * *